United States Patent

[11] 3,609,129

| [72] | Inventors | Valentina Nikolaevna Krasulina<br>prospekt Morisa Toreza, 102, korp. 5, kv. 267, Leningrad;<br>Anna Valentinovna Novoselova, Tramvainy prospekt, 32, kv. 5, Leningrad; Alexei Andreevich Korotkov, deceased, late of Leningrad; Maria Julievna Lekakh, administratrix, Naberezhnaya Chernoi rechki, 10, kv. 7, Leningrad of said Alexei Andreevich Korotkov, deceased; Sergei Alexeevich Korotkov, administrator, Naberezhnaya Chernoi rechki, 10, kv. 7, Leningrad, U.S.S.R. of said Alexei Andreevich Korotkov, deceased |
|---|---|---|
| [21] | Appl. No. | 738,730 |
| [22] | Filed | June 14, 1968 |
| [45] | Patented | Sept. 28, 1971 |

[54] METHOD OF POLYMERIZING ACRYLONITRILE IN THE PRESENCE OF AN ALKALI METAL ALCOHOLATE OF AN α-HYDROXYALKYLAMINE
6 Claims, No Drawings

| [52] | U.S. Cl. | 260/85.5, 260/32.6, 260/88.7, 260/570.6, 260/584 R |
|---|---|---|
| [51] | Int. Cl. | C08f 3/76, C08f 15/22 |
| [50] | Field of Search | 260/85.5, 85.5 L, 88.7 |

[56] References Cited
UNITED STATES PATENTS
2,817,649  12/1957  Contois ...................... 260/85.5 (orig)

*Primary Examiner*—Harry Wong, Jr.
*Attorney*—Waters, Roditi, Schwartz & Nissen

ABSTRACT: Polyacrylonitrile is produced by polymerizing acrylonitrile in the presence of a novel catalyst at a temperature of −80° C. to 40° C. The catalyst is an alkali metal alcoholate of an α-hydroxyalkylamine.

METHOD OF POLYMERIZING ACRYLONITRILE IN THE PRESENCE OF AN ALKALI METAL ALCOHOLATE OF AN α-HYDROXYALKYLAMINE

The present invention relates to methods of producing polyacrylonitrile.

Polyacrylonitrile is used in the production of fibers, films, molded articles, etc., which find applications both in technological progresses and in the manufacture of consumer goods.

There are known in the art methods of producing polyacrylonitrile, which consist in the polymerization of acrylonitrile or the copolymerization of acrylonitrile with vinyl monomers in the presence of catalysts, in a solvent for the polymer which is inert to the catalysts employed.

Thus, for example, a method is known of producing polyacrylonitrile, which consists in the polymerization of acrylonitrile at 0° C. in dimethyl formamide in the presence of n-butyl lithium in petroleum ether which serves as the catalyst.

The polyacrylonitrile obtained by the above-mentioned method is colored, has a low molecular weight 14,000) and is low in yield.

It is an object of this invention to provide a method of producing polyacrylonitrile in 100 percent yield, which would be a homogeneous and colorless substance and have a molecular weight that could be regulated within a wide range while the molecular weight distribution remains narrow.

In accordance with the said and other objects, the present invention consists in that the polymerization of acrylonitrile or its copolymerization with vinyl monomers is carried out at a temperature of −80° to +40° C. in the presence of an N-substituted amide solution of alkali metal alcoholates of α-hydroxyalkylamines, which serve as the catalysts.

The alkali metal alcoholates of α-hydroxyalkylamines have the following general formula:

Where
R — alkyl or aryl group;
R′ — alkyl, aryl or hydrogen;
M — alkali metal.

The alkali metal alcoholates of α-hydroxyalkylamines are new chemical compounds, and also constitute a subject of the present invention. They can be produced by the reaction of alkali metals or alkali metal alkyls or aryls with amides or N-substituted amides of organic acids.

In addition, alkali metal alcoholates of α-hydroxyalkylamines having the general formula:
RR′C(OM)NR$_2$
where
R — alkyl or aryl group;
R′ — alkyl, aryl or hydrogen;
M — alkali metal
can be produced by the reaction of alkali metal amides or N-substituted amides with aldehydes or ketones in a hydrocarbon medium.

The method of producing polyacrylonitrile is carried out as follows.

Into a heated with a flame of a gas burner and evacuated three-necked glass flask equipped with a stirrer and a distribution manifold are distilled the solvent for a polymer, for example, dimethyl formamide, and acrylonitrile, both of which have been dried over calcium hydride. In the case of copolymerization, into the flask is also distilled a vinyl monomer, for example, methyl acrylate or methyl methacrylate.

The temperature of the resulting solution is brought to the reaction temperature −80° to +40° C., and to the reactants which are being stirred is added under a counterflow of an inert gas a solution of the catalyst dissolved in an N-substituted amide of an organic acid, for acid, for example, dimethyl formamide, dimethyl acetamide, or others.

The molecular weight of the polyacrylonitrile can be regulated within wide limits from 50,000 to 600,000, by selecting properly the concentration of acrylonitrile and the catalyst and the temperature of the process.

The selected temperature for the reaction mixture and the stirring are maintained for a period of 1–5 minutes.

In some cases, owing to the high-reaction rate of the polymerization process, it is sufficient to bring the temperature of the monomer solution to the required level without maintaining it further.

The process is stopped by the addition of several drops of sulfuric acid to the solvent for the polymer.

The resultant viscous, colorless homogeneous solution of the polymer is suitable for making films and molding fibers.

The fibers produced are comparable in quality to the best industrial fibers of the type "Nitron" and exceed them in elasticity and in thermomechanical properties. The fibers have a breaking strength up to 60 km. and 10–20 percent elongation.

Polyacrylonitrile can also be produced in solid form by pouring the solution into water.

The process results in a 100 percent yield of polyacrylonitrile.

The solutions of alkali metal alcoholates of α-hydroxyalkylamines, in N-substituted amides of organic acids which are used as the catalyst in the present process of producing polyacrylonitrile, can be synthesized by the following method.

Into an evacuated ampul with two side arms is distilled an amide or N-substituted amide of organic acid dried over calcium hydride, and to it under the counterflow of an inert gas is added an alkali metal, or alkalimetal, alkyl or aryl.

In order to prepare simultaneously the solutions of alkali metal alcoholates of α-hydroxyalkylamines, the said process is carried out in an excess of the amide of N-substituted amide of an organic acid. The dissolution of the obtained alkali metal alcoholates of α-hydroxyalkylamines is accelerated by carrying out the process at ∼80°C.

Furthermore, the alkali metal alcoholates of α-hydroxyalkylamines, having the general formula, RR′C(OM)NR$_2$, can be prepared by the following method.

Into an ampul with two side arms which has been heated with a flame of a gas burner and purged with an inert gas is charged an alkali metal amide or alkali metal N-substituted amide, and to it is added a hydrocarbon, for example, hexane, and an equimolecular amount (in respect to the amount of the amide) of aldehyde or ketone. At the end of the reaction, which is indicated by the disappearance of the solid amide, the solution is filtered through a glass filter.

In order to produce solutions of the alkali metal alcoholates of α-hydroxyalkylamines that are used as the catalysts, the filtrate is transferred into an ampul with two side arms into which prior to the filtrate transfer, an amide or N-substituted amide of an organic acid, preliminarily dried over calcium hydride, has been distilled. Then the hydrocarbon is stripped off; and the alkali metal alcoholates of α-hydroxyalkylamines form a precipitate which, after being kept at room temperature or upon being heated to ∼80°C, turns into a solution.

The catalysts used in the present method for the production of polyacrylonitrile provide a product having a narrow molecular weight distribution.

For a better understanding of the present invention, the following examples of the production of polyacrylonitrile and the catalysts employed are given by way of illustration.

EXAMPLE 1

Into an evacuated ampul with two side arms were distilled 25 ml. of dimethyl formamide, which prior to use had been dried over calcium hydride.

The temperature of the solution was lowered to −60° C., and under an inert gas counterflow to it were added 2 ml. of 1.8 N solution of n-butyl lithium in hexane. The temperature was brought up to room temperature, and hexane was carefully stripped under slightly reduced pressure. The pressure in the ampul was brought to the atmospheric level by filling it with an inert gas, and then the ampul was hermetically sealed.

After ten days of periodic shaking a homogeneous 0.13 M solution of the catalyst was obtained.

Into a heat-flushed and evacuated three-necked flask connected to a distribution manifold were distilled 85 ml. or dimethyl formamide and 6.0 ml. (0.99 g.-mole/l. of acrylonitrile. The temperature was brought to −60° C. and then with stirring under an inert gas counterflow was added 0.66 ml. (0.001 g.-mole/l.) of the catalyst.

The said temperature was kept for 3 minutes, during which time stirring was continued, following which to the reaction mixture was added one drop of concentrated sulfuric acid dissolved in 5 ml. of dimethyl formamide.

The product was a colorless, homogeneous solution of the polymer.

The yield of polyacrylonitrile was 100 percent, $[I] = 1.8$.

EXAMPLE 2

To 13 ml. of dimethyl formamide heated to 100° C. under an inert gas counterflow were gradually added 2 ml. of 1.8 N solution of n-butyl lithium in hexane.

The solution was kept for 5 minutes at 100° C. and then cooled with running water.

The product obtained consisted of 0.34 N catalyst solution.

Into a flask equipped with a stirrer were distilled 85 ml. of dimethyl formamide and 6.0 ml. (0.99 g.-mole/l.) of acrylonitrile.

The temperature was lowered to −60° C., and then while being stirred to the solution was added under an inert gas counterflow 0.6 ml. (0.0012 g.-mole/l.) of the catalyst. The said temperature and stirring were maintained for 3 minutes, following which to the reaction mixture was added one drop of concentrated sulfuric acid dissolved in 5 ml. of dimethyl formamide under constant stirring until a homogeneous solution was formed. Then under reduced pressure 55 ml. of dimethyl formamide were stripped off from the reaction mixture kept at temperature up to 60° C., and the hot solution was filtered through a glass No. 2 filter. The fiber was formed in a bath kept at room temperature and consisting of glycerol and dimethyl formamide followed by a 20-fold stretching in glycerol at 140° C.

The fiber obtained had a breaking strength of 65 km. and 13 percent elongation. The yield of the polymer was 100 percent, $[I] = 2.5$.

EXAMPLE 3

From 55 ml. of the dimethyl formamide distillate (see Example 2) kept for 2 days over calcium hydride, the first 5 ml. were stripped off and discarded and the remaining 50 ml. were distilled into the polymerization flask. Then into the flask were distilled 4.0 ml. (1.1 g.-mole/l.) of acrylonitrile. The temperature was lowered to −60° C. and then under an inert gas counterflow was added with stirring 0.35 ml. (0.0012 g.-mole/l.) of the catalyst (see Example 2). The reactants were kept at a temperature of −60° C. for 3 minutes with stirring, following which to the reactants was added one drop of concentrated sulfuric acid dissolved in 5 ml. of dimethyl formamide, and stirring was continued until a homogeneous solution was formed. Then 30 ml. of the solvent were stripped off at 60° C. under reduced pressure. Further treatment was analogous to that described in Example 2.

The fiber obtained had a breaking strength of 60 km. and 12 percent elongation.

The yield of the polymer was 100 percent, $[I] = 2.6$.

EXAMPLE 4

Into a polymerization flask were distilled 85 ml. of dimethyl formamide and 6.0 ml. (0.99 g.-mole/l.) of acrylonitrile. The temperature of the mixture was lowered to −60° C.

Following this the cooling of the mixture was discontinued, and to the mixture under an inert gas counterflow was added 0.5 ml. (0.001 g.-mole/l.) of the catalyst (see Example 2). After a 3 minute interval to it were added two drops of concentrated sulfuric acid in 5 ml. of dimethyl formamide, and the polymerization product was precipitated in water. The polymer was filtered, washed with water and dried at 60° C. to constant weight.

The yield of the polymer was 100 percent; $[I] = 2.8$.

From the 14 percent solution of the polymer in dimethyl formamide, a fiber was obtained by the method analogous to that described in Example 2.

The fiber had a breaking strength of 50 km. and 15 percent elongation.

EXAMPLE 5

Dimethyl amide lithium (0.65 g., 0.0125 mole) was placed into a heated with a flame of a gas burner and purged with argon ampul with two side arms into which were placed 20 ml. of hexane and 0.9 g. (0.0125 mole) of n-butyraldehyde. At the completion of the reaction, which is indicated by the disappearance of the lithium dimethylamide residue, the solution was filtered through a glass filter No. 4. Then to 16 ml. of dimethyl formamide warmed up to 80° C. were added under an argon counterflow 4 ml. of the filtered solution, and the mixture was heated for an additional 30 minutes. The final product was a 0.12 N solution of the catalyst.

Into a polymerization flask were distilled 50 ml. of dimethyl formamide and 3.6 ml. (1 g.-mole/l.) of acrylonitrile. The temperature of the mixture was lowered to −60° C., and to the mixture was added with stirring and under an inert-gas counterflow 0.8 ml. (0.001 g.-mole/l.) of the catalyst solution. The reactants were kept at a temperature of −60° C. with stirring for 3 minutes, following which to them was added one drop of sulfuric acid dissolved in 5 ml. of dimethyl formamide. Then the polymer was precipitated in water.

The yield of the polymer was 100 percent; $[I] = 2.8$.

From a 14 percent solution of the polymer in dimethyl formamide a fiber was obtained by a method analogous to that described in Example 2. The fiber had a breaking strength of 55 km. and 12 percent elongation.

EXAMPLE 6

Into a heated with a flame of a gas burner and evacuated ampul with two side arms were distilled 18 ml. of dimethyl formamide, and under an argon counterflow was introduced 0.067 g. of lithium.

After the mixture had been kept for 20 minutes at 40° C. a 0.95 N solution of the catalyst was obtained.

Into a flask were distilled 50 ml. of dimethyl formamide and 3.6 ml. (1 g.-mole/l.) of acrylonitrile.

The temperature was brought to 0° C., and with constant stirring under an inert gas counterflow was added 0.53 ml. (0.005 g.-mole/l.) of the catalyst.

The reactants were kept at 0° C. with stirring, for 3 minutes, following which to them were introduced three drops of sulfuric acid dissolved in 5 ml. of dimethyl formamide.

The yield of the polymer was 100 percent; $[I] = 2.8$.

EXAMPLE 7

The catalyst was obtained by a method analogous to that described in Example 6.

Into a flask were distilled 50 ml. of dimethyl formamide and 10.8 ml. (3 g.-mole/l.) of acrylonitrile. The temperature was lowered to −40° C. and under an inert gas counterflow with stirring was added 0.53 ml. (0.005 g.-mole/l.) of the catalyst.

The reactants were kept at −40° C. with stirring for 3 minutes, following which to them were added three drops of sulfuric acid dissolved in 5 ml. of dimethyl formamide. A homogeneous, viscous colorless solution was obtained.

The yield of polyacrylonitrile was 100 percent; $[I] = 2.9$.

A fiber was obtained from the above solution in a water-dimethyl formamide bath followed by a seven-fold extraction.

The fiber obtained had a breaking strength of 48 km. and 12 percent elongation.

EXAMPLE 8

Into an ampul with two side arms was placed 0.39 g. (0.0076 mole) of dimethyl amide lithium, and then 10 ml. of hexane were distilled in the ampul. To the suspension was added 0.45 ml. (0.0062 mole) of acetone.

After a 20 minute period the solution was filtered through a glass filter No. 4, and gradually under an argon counterflow of argon the solution was poured into 23 ml. of dimethyl formamide, which was warmed to 90° C. After the reaction mixture was kept for 20 minutes at 90° C., a 0.24 N solution of the catalyst was obtained.

Into the polymerization flask were distilled 50 ml. of dimethyl formamide and 3.6 ml. (1.0 g.-mole/l.) of acrylonitrile. The temperature was lowered to −60° C., and under an inert gas counterflow with stirring was added 0.5 ml. (0.0012 g.-mole/l.) of the catalyst solution. The reactants were kept for 3 minutes at −60° C. with stirring and to them was added one drop of concentrated sulfuric acid dissolved in 5 ml. of dimethyl formamide. The product was a transparent, colorless and homogeneous solution of the polymer. The yield of polyacrylonitrile was 100 percent, $[I]=2.6$.

EXAMPLE 9

To 10 ml. of dimethyl acetamide warmed up to 80° C. under an argon counterflow were gradually added 2 ml. of 1.8 N solution of n-butyl lithium in hexane.

The solution was kept for 5 minutes at 80° C., yielding a 0.34 N solution of the catalyst.

Into a flask were distilled 85 ml. of dimethyl formamide and 60 ml. (0.99 g.-mole/l.) of acrylonitrile.

The temperature was lowered to −60° C. and under an inert gas counterflow with stirring was added 0.6 ml. (0.0012 g.-mole/l.) of the catalyst.

The reactants were kept for 3 minutes at −60° C. with stirring and then to them was added one drop of sulfuric acid dissolved in 5 ml. of dimethyl formamide.

A colorless, homogeneous solution of the polymer was obtained.

The yield of polyacrylonitrile was 100 percent; $[I]=3.4$.

EXAMPLE 10

To 10 ml. of phenylmethyl formamide warmed to 8° C. under an argon counterflow was gradually added 1 ml. of 1.8 N hexane solution of n-butyl lithium. The yield was a 0.36 N solution of the catalyst.

Into a flask were distilled 50 ml. of dimethyl formamide and 3.6 ml. (1 g.-mole/l.) of acrylonitrile. The temperature was lowered to −60° C. and under an inert gas counterflow with stirring was added 0.3 ml. (0.001 g.-mole/l.) of the catalyst solution.

The reactants were kept at −60° C. for 3 minutes with stirring and then to them were added two drops of concentrated sulfuric acid dissolved in 5 ml. of dimethyl formamide. A homogeneous, colorless, transparent solution of the polymer was obtained.

The yield of polyacrylonitrile was 100 percent; $[I]=3.2$.

EXAMPLE 11

Into an ampul with two side arms were distilled 10 ml. of dimethyl formamide and to it were gradually added 4 ml. of 0.86 N solution of sodium naphthaline in tetrahydrofuran. Tetrahydrofuran was carefully stripped off and the contents of the ampul were kept for 9 hours at 80° C.

The result was 0.5 N solution of the catalyst.

Into a flask were distilled 50 ml. of dimethyl formamide and 3.6 ml. (1.0 g.-mole/l.) of acrylonitrile.

The temperature was lowered to −60° C., and under an inert gas counterflow with stirring was added 0.2 ml. (0.001 g.-mole/l.) of the catalyst solution. The reactants were kept at −60° C. for 3 minutes with stirring and then to them was added one drop of concentrated sulfuric acid dissolved in 5 ml. of dimethyl formamide. The polymer was precipitated in water, and then washed successively with water, ethanol and ether in order to remove the naphthalene.

The yield of polyacrylonitrile was 96 percent; $[I]=2.6$.

EXAMPLE 12

To 13 ml. of dimethyl formamide heated to 100° C. under an argon counterflow was gradually added 1 ml. of 1.8 N solution of n-butyl lithium, in hexane.

The solution was kept at 100° C. for 5 minutes and then cooled with running water. A 0.28 N solution of the catalyst was obtained.

Into a flask were distilled 50 ml. of dimethyl formamide, 3.6 ml. (1 g.-mole/l.) of acrylonitrile and 1 ml. (0.2 g.-mole/l.) of methyl acrylate.

The temperature was lowered to −60° C., and to the reaction mixture under an inert gas counterflow with stirring was added 0.8 ml. (0.002 g.-mole/l.) of the catalyst.

The reactants were kept for 3 minutes at −60° C. with stirring and to them were added two drops of concentrated sulfuric acid dissolved in 5 ml. of dimethyl formamide.

A homogeneous, viscous, colorless solution of the copolymer was obtained.

The yield of the copolymer was 70 percent; $[I]=2.2$, the concentration of methyl acrylate in the copolymer being 8 mole percent.

EXAMPLE 13

Into a flask were distilled 20 ml. of dimethyl formamide, 1.0 ml. (0.7 g.-mole/l.) of acrylonitrile and 0.2 ml. (0.08 g.-mole/l.) of methyl methacrylate. The temperature of the mixture was lowered to −60° C., and to the mixture was added 0.45 ml. (0.003 g.-mole/l.) of the catalyst (see Example 12). After 3 minutes the reaction was discontinued by the addition of two drops of concentrated sulfuric acid dissolved in 5 ml. of dimethyl formamide. A homogeneous, colorless, viscous solution of the copolymer was obtained. The yield of the product was 80 percent; $[I]=2.4$, the concentration of methyl methacrylate in the copolymer being 7 mole percent.

Although the present invention has been described in accordance with a preferred embodiment, various changes and modifications may be made without departing from the spirit and scope thereof as will be understood by these skilled in the art. These changes and modifications are to be considered as falling within the spirit and scope of the invention as defined in the appended claims.

What is claimed is:

1. A method of producing polyacrylonitrile comprising polymerizing acrylonitrile at a temperature between −80° C. and +40° C. in the presence of an effective amount of a catalyst, said polymerizing being effected in a solvent for polyacrylonitrile which is inert to the catalyst, the catalyst being a solution of a compound having the formula:

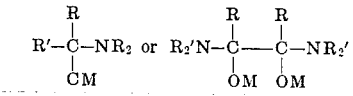

wherein R is alkyl or aryl, R′ is alkyl, aryl or hydrogen and M is an alkali metal in an N-substituted amide of an organic acid.

2. A method according to claim 1, wherein the N-substituted amide of an organic acid is dimethyl formamide or dimethyl acetamide.

3. A method according to claim 1, wherein the solvent is dimethylformamide.

4. A method of producing a copolymer of acrylonitrile and a vinyl monomer comprising copolymerizing acrylonitrile and a vinyl monomer at a temperature between −80° C. and +40° C. in the presence of an effective amount of a catalyst, said copolymerizing being effected in a solvent for the copolymer which is inert to the catalyst, the catalyst being a solution of a compound having the formula

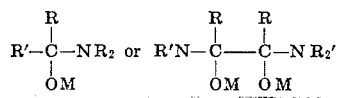

wherein R is alkyl or aryl; R' is alkyl, aryl or hydrogen and M is an alkali metal in an N-substituted amide of an organic acid.

5. A method according to claim 4, wherein the N-substituted amide of an organic acid is dimethyl formamide or dimethyl acetamide.

6. A method according to claim 4, wherein the solvent is dimethylformamide.